(12) United States Patent
Lee et al.

(10) Patent No.: US 10,303,952 B2
(45) Date of Patent: May 28, 2019

(54) METHOD OF DETECTING A MOVING OBJECT BY RECONSTRUCTIVE IMAGE PROCESSING

(71) Applicants: Sungjin Lee, Gwangmyeong-si (KR); Taewoo Kim, Seoul (KR)

(72) Inventors: Sungjin Lee, Gwangmyeong-si (KR); Taewoo Kim, Seoul (KR)

(73) Assignee: INNODEP CO., LTD., Seoul (KR)

(*) Notice: Subject to any disclaimer, the term of this patent is extended or adjusted under 35 U.S.C. 154(b) by 77 days.

(21) Appl. No.: 15/473,397

(22) Filed: Mar. 29, 2017

(65) Prior Publication Data

US 2018/0046866 A1 Feb. 15, 2018

(30) Foreign Application Priority Data

Aug. 11, 2016 (KR) .................. 10-2016-0102090

(51) Int. Cl.
*H04N 7/18* (2006.01)
*G06K 9/00* (2006.01)
(52) U.S. Cl.
CPC ........... *G06K 9/00771* (2013.01); *H04N 7/18* (2013.01)
(58) Field of Classification Search
CPC combination set(s) only.
See application file for complete search history.

(56) References Cited

U.S. PATENT DOCUMENTS

| 9,177,225 | B1* | 11/2015 | Cordova-Diba | .......... G06T 5/00 |
| 2008/0250037 | A1* | 10/2008 | Date | ................. G06F 17/30038 |
| 2012/0079380 | A1* | 3/2012 | Tsai | ................. G06F 17/30017 |
| | | | | 715/716 |
| 2017/0206761 | A1* | 7/2017 | Li | ..................... G08B 13/19691 |

FOREIGN PATENT DOCUMENTS

| KR | 10-2005-0080430 A | 8/2005 |
| KR | 10-2011-0068784 A | 8/2005 |
| KR | 10-0883632 B1 | 2/2009 |
| KR | 10-1612483 B1 | 4/2016 |

* cited by examiner

*Primary Examiner* — Behrooz M Senfi
(74) *Attorney, Agent, or Firm* — John K. Park; Park Law Firm

(57) ABSTRACT

Disclosed is a method of detecting a moving object in video produced in a plurality of CCTV cameras. In the present invention, a video reconstruction is applied to the CCTV storage video in order to significantly reduce the amount of video data, and then an image processing is performed on the reconstructed storage video in order to detect a moving object and further to extract metadata thereof. According to the present invention, staff members of the integrated control center may efficiently search any possible critical objects in the CCTV storage video.

10 Claims, 7 Drawing Sheets

1/64

(Original Image 1 - 1920x1088) (Thumbnail Image 1 - 240*136)

1/64

(Original Image 2 - 1920x1088) (Thumbnail Image 2 - 240*136)

(Original Image 1 - 1920x1088)    1/64    (Thumbnail Image 1 - 240*136)

(Original Image 2 - 1920x1088)    1/64    (Thumbnail Image 2 - 240*136)

METHOD OF DETECTING A MOVING OBJECT BY RECONSTRUCTIVE IMAGE PROCESSING

BACKGROUND OF THE INVENTION

The present invention generally relates to a method of detecting a moving object in video produced in a plurality of CCTV cameras.

More specifically, the present invention relates to a method of detecting a moving object in CCTV storage video, in which a video reconstruction is applied to the CCTV storage video in order to significantly reduce the amount of video data, and then an image processing is performed on the reconstructed storage video in order to detect a moving object and further to extract metadata thereof, whereby staff members of the integrated control center may efficiently search any possible critical objects in the CCTV storage video.

Recently, pluralities of CCTV cameras are installed for the purpose of crime prevention as well as proof of criminal evidence. The videos taken in these CCTV cameras are delievered to police stations or integrated control center, in which staff members monitor the videos for detecting any possible abnormal behavior or criminal evidence.

As the number of CCTV cameras has rapidly increased, the number of staff members becomes not enough to appropriately handle the cameras. According to the National Police Agency data of 2011, the staff members of Seoul are monitoring 45 CCTV cameras per people in average, which renders the crime prevention uneffective.

In the course of criminal investigation, criminal tracing or lost-child search, it may be necessary to check CCTV storage video. The CCTV storage video has been provided from a plurality of CCTV cameras and stored in a storage device for a period of time (e.g., 7 days). In this case, a small number of staff members are conventionally looking over the massive videos. This type of work is far from efficient.

However, it is impractical to expand the staff members for solving the above-mentioned problem. Alternatively, the intelligent control system has been proposed in which the CCTV videos are analyzed by utilizing image processing technology so as to detect and present objects on which staff members may have attention (i.e., critical objects).

In conventional intelligent control system, a specific person shall be exactly identified in CCTV video in view of features of face, facing direction, facial expression, and size of face image. In order to achieve this design specification, the conventional intelligent control system shall incorporate algorithms of object detection and object context recognition.

The integrated control system generally receives and stores videos from thousands of CCTV cameras. Further, CCTV cameras currently provide high-resolution videos, e.g., a series of frame images of 1920*1088 resolution. In order to appropriately perform the heavy algorithms, i.e. object detection algorithm and object context recognition algorithm, on massive amount of high-resolution videos, the intelligent control system shall be equipped with a very high-performance image analysis server or alternatively with a many numbers of image analysis servers. That is why the intelligent control system is not widely adopted.

SUMMARY OF THE INVENTION

It is, therefore, an object of the present invention to provide a method of detecting a moving object in video produced in a plurality of CCTV cameras.

More specifically, it is an object of the present invention to provide a method of detecting a moving object in CCTV storage video, in which a video reconstruction is applied to the CCTV storage video in order to significantly reduce the amount of video data, and then an image processing is performed on the reconstructed storage video in order to detect a moving object and further to extract metadata thereof, whereby staff members of the integrated control center may efficiently search any possible critical objects in the CCTV storage video.

One aspect of the present invention is to provide a method of detecting moving object in CCTV storage video by reconstructive image processing, the method comprises: obtaining N partial videos of the CCTV storage video (where, N is an integer; N>2); obtaining N thumbnail videos by downscaling the N partial videos, respectively; merging the N thumbnail videos in a single frame so as to form a merged-thumbnail video; and performing image analysis on the merged-thumbnail video so as to identify a moving object out of the merged-thumbnail video.

In the present invention, the obtaining N partial videos may comprise: obtaining an original video of a predetermined time period out of the CCTV storage video; and dividing the original video into the N partial videos.

In the present invention, the method of detecting moving object may further comprise: obtaining metadata of the moving object corresponding to exposure attribute in the merged-thumbnail video; identifying a frame of the original video in which the moving object is identified based on the metadata (hereinafter, it is referred as 'a moving-detected original frame'); reverse-mapping the moving-object location in the merged-thumbnail video by the downscaling ratio so as to identify the exposure area of the moving object in the moving-detected original frame (hereinafter, it is referred as 'a moving-object area'); selecting the moving-object area out of the moving-detected original frame so as to obtain a snapshot of the moving object; classifying the moving object into either significant object or nonsignificant object by comparing the metadata with predetermined threshold condition; filtering out the nonsignificant object; and presenting the snapshot of the moving object to staff members distinguishably from the original video.

In the present invention, the metadata of the moving object may include at least one of size, location, appearance location, disappearance location, moving speed, moving distance, moving track, and dwell time of the moving object.

Further, the non-transitory computer-readable medium according to the present invention contains program code which executes the above-mentioned methods of detecting moving object in CCTV storage video by reconstructive image processing.

DESCRIPTION OF SPECIFIC EMBODIMENTS

Exemplary embodiments of the invention will be described below in more detail with reference to the accompanying drawings.

Figure 1:
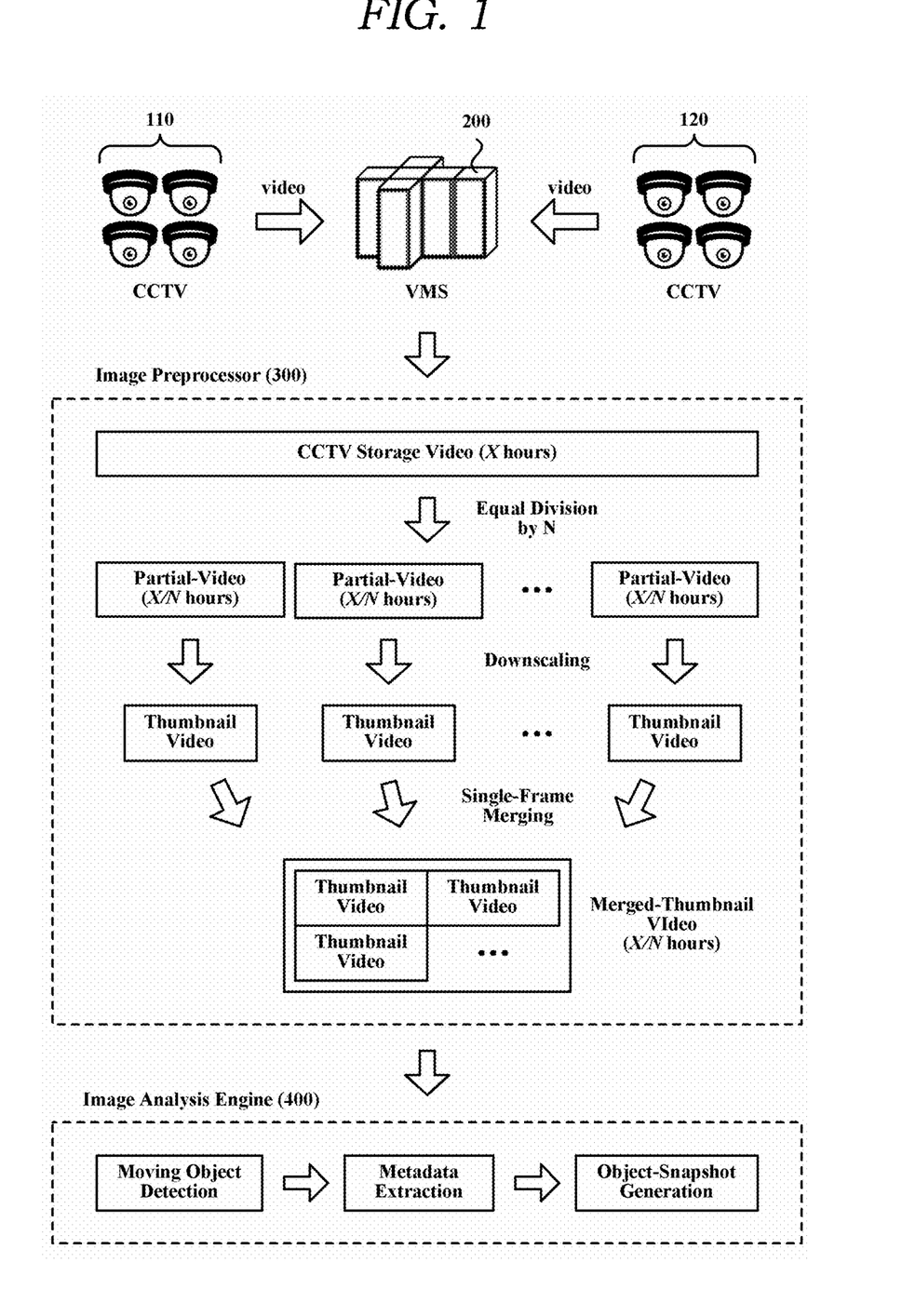
FIG. 1 is a view illustrating an analytical processing system of CCTV storage video according to an embodiment of the present invention.

FIG. 1 is a view illustrating an analytical processing system of CCTV storage video according to an embodiment of the present invention.

Referring to FIG. 1, a plurality of CCTV cameras 110, 120 generate video data and provide them to a video management server (VMS) 200. The VMS 200 receives the video data, and then stores them in a storage device (e.g., a hard-disk drive).

The Image preprocessor 300 applies video reconstruction on the storage video so as to significantly reduce the amount of video data. The video reconstruction includes video division and video merging. Then, the image analysis engine 400 detects a moving object out of the reconstructed video by performing image processing. Further, the image analysis engine 400 extracts metadata of the moving object which indicates exposure attribute thereof, and obtains snapshot of the moving object.

By referring to the information of moving object, metadata and snapshot, staff members of the integrated control center may efficiently search any possible critical objects out of massive CCTV storage video.

The present invention may be effectively utilized in assisting the search of a critical object (e.g., a criminal suspect, a missing child) in CCTV storage video. The points which the inventor has noticed in configuring the present invention are as below.

First, it is common that critical objects are found in a form of moving objects in CCTV video rather than of stationary objects. Therefore, moving objects are searched for in the CCTV storage video in the present invention.

Second, high-resolution image is not necessary for identifying moving objects. Rather, the downscaled image which is obtained by lowering the resolution from the original image is good enough for image analysis for identifying moving objects. Further, the downscaled image may enhance the processing speed of the image analysis. Once a moving object is identified from the downscaled image, its high-resolution snapshot may be obtained from the corresponding original image so as to provide the snapshot to staff member for reference.

Third, the identification result of the moving objects may contain noise, i.e., nonsignificant or meaningless information. It is preferable to remove the noise from the moving objects. For that purpose, metadata is extracted so as to reflect exposure attribute of the moving objects, including at least one of size, location, appearance location, disappearance location, moving speed, moving distance, moving track, and dwell time of the moving object. Then, the noise in the moving objects is filtered out with reference to the metadata.

Fourth, the storage video may provide overall frame data to be analyzed, which may be preferably utilized. In the present invention, a preprocessing may be performed in which overall frame data of time period X is divided by N and each of N partial videos of time period (X/N) is downscaled into low-resolution video and then the N downscaled partial videos (i.e., N thumbnail videos) are merged in a single frame. By the preprocessing, the amount of video data for the image processing may be significantly reduced, by which the processing time for the image analysis may be also significantly reduced.

Fifth, the image analysis for identifying a moving object is not performed on the original video but on the merged-thumbnail video which is obtained through dividing, downscaling and single-frame merging. Therefore, the metadata obtained in the image analysis shall be handled with referring to the reverse-mapping to the original coordinates.

As described above, the conventional technology of detecting critical objects out of CCTV storage video has incorporated very complicated algorithms for object detection and object context recognition. In special, the conventional technology has required high-resolution image in order to output a reliable detection result.

On the contrary, the present invention has incorporated a lightweight algorithm for identifying moving objects only. Accordingly, in the present invention, the identifying result of moving objects when the lightweight algorithm is performed on low-resolution video is similar to that for high-resolution video. Further, image processing on low-resolution video may provide faster processing speed. The demerits which are incurred by identifying moving objects only may be complemented by utilizing the metadata and snapshot.

The overall procedure of the present invention shall be described below with referring to FIG. 1.

The CCTV cameras 110, 120 provide videos to the video management server (VMS) 200, and the video management server 200 stores the CCTV videos.

The Image preprocessor 300 obtains CCTV storage video from the VMS 200 so as to perform image analysis operation on the CCTV storage video for detecting moving objects. For ease of explanation, let's denote the running time of the CCTV storage video as 'X hours'. The X hours may be configured as rather long (e.g., 24 hours) or very short (e.g., a few seconds). In an example, the storage video to perform the image analysis may be either selected by operation of staff members or automatically selected by a configuration of an image analysis software without intervention of staff members.

The Image preprocessor 300 divides the CCTV storage video by N so as to generate N partial videos each of which corresponds to (X/N) hours. Preferably, the CCTV storage video may be equally divided by N. In other embodiment, the image preprocessor 300 may be provided N different CCTV storage videos from the VMS 200.

In an embodiment, a CCTV storage video of one (1) hour may be provided to the image preprocessor 300 so as to be divided into six (6) partial videos of 10 minutes. In other embodiment, six (6) CCTV storage videos of 10 minutes from six (6) CCTV cameras may be provided to the image preprocessor 300. In the latter case, the six (6) CCTV storage videos from six (6) CCTV cameras may be denoted as 'partial videos' in this specification because they are of divided form in comparison with the merged-thumbnail video.

However, the former embodiment in which the partial videos are obtained by dividing one CCTV storage video is more preferable because the partial videos may have more uniform file attributes as well as video characteristics.

Next, the image preprocessor 300 downscales each of the N partial videos into N videos of small-size and low-resolution. When focusing on one partial video, high-resolution frame images of the partial video are downscaled into small-size and low-resolution images. Then, the small-size low-resolution thumbnail video may be created by sequencing the downscaled images. This process is performed on every partial video, by which the N thumbnail video may be created.

Figure 2:
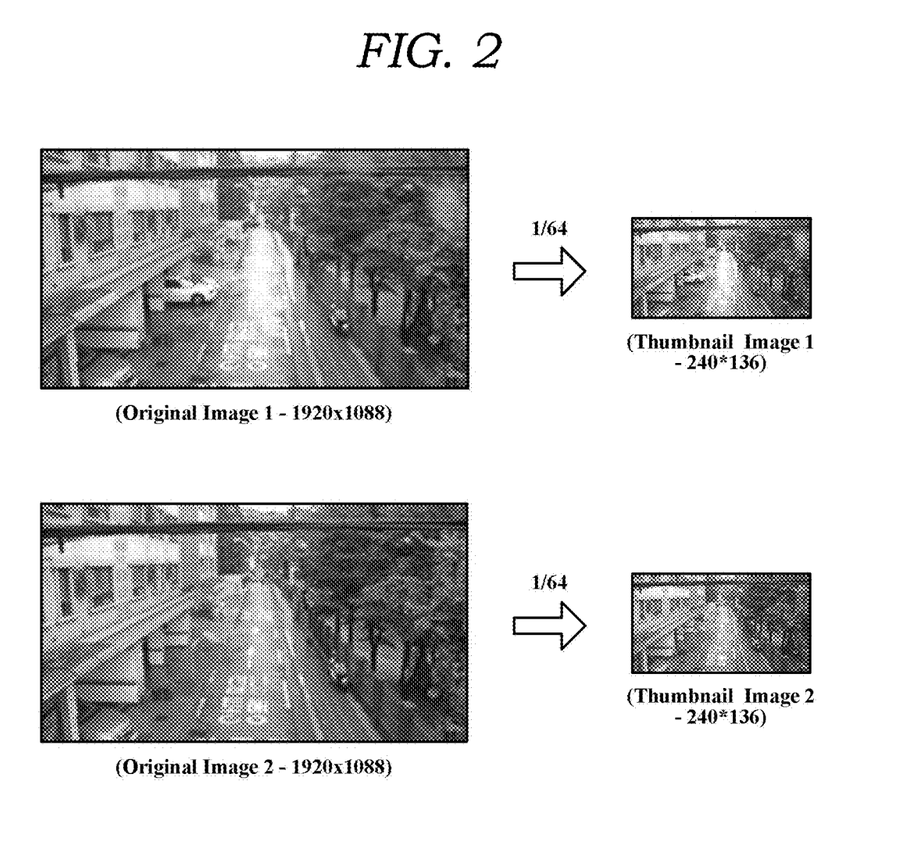
FIG. 2 illustrates an example of generating a thumbnail video in the present invention.

FIG. 2 illustrates an example of generating a thumbnail video in the present invention.

Referring to FIG. 2, two consecutive high-resolution images (1920*1088) of a partial video are downscaled by 1/64 into low-resolution thumbnail images (240*136) for a thumbnail video, respectively. By downscaling each of high-resolution images of the N partial videos, the N thumbnail videos may be obtained. Similar to the partial videos, each of the thumbnail videos corresponds to (X/N) hours.

Then, the image preprocessor 300 merges the N thumbnail videos in a single frame format so as to create a merged-thumbnail video. That is, by merging the N small-size low-resolution images in a single frame format, each of which is obtained from each of the N partial videos, a bigger-size image of the merged-thumbnail video may be created.

Figure 3:
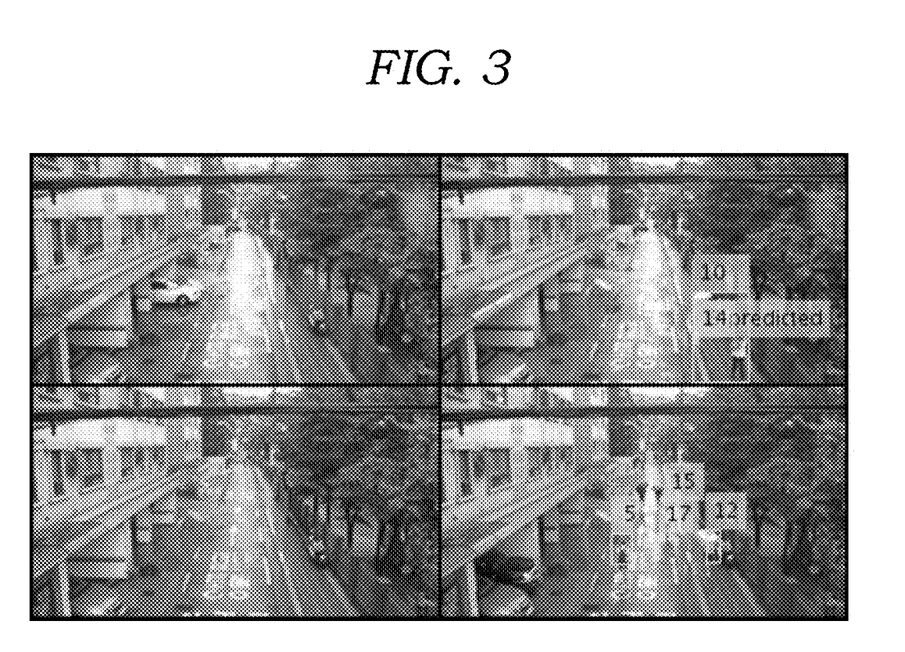
FIG. 3 illustrates an example of merged-thumbnail video in the present invention.

FIG. 3 illustrates an example of a image of the merged-thumbnail video, in which four (4) 240*136 images from four (4) partial videos are merged in a single frame format so as to create a 480*272 image of the merged-thumbnail video.

Figure 4:
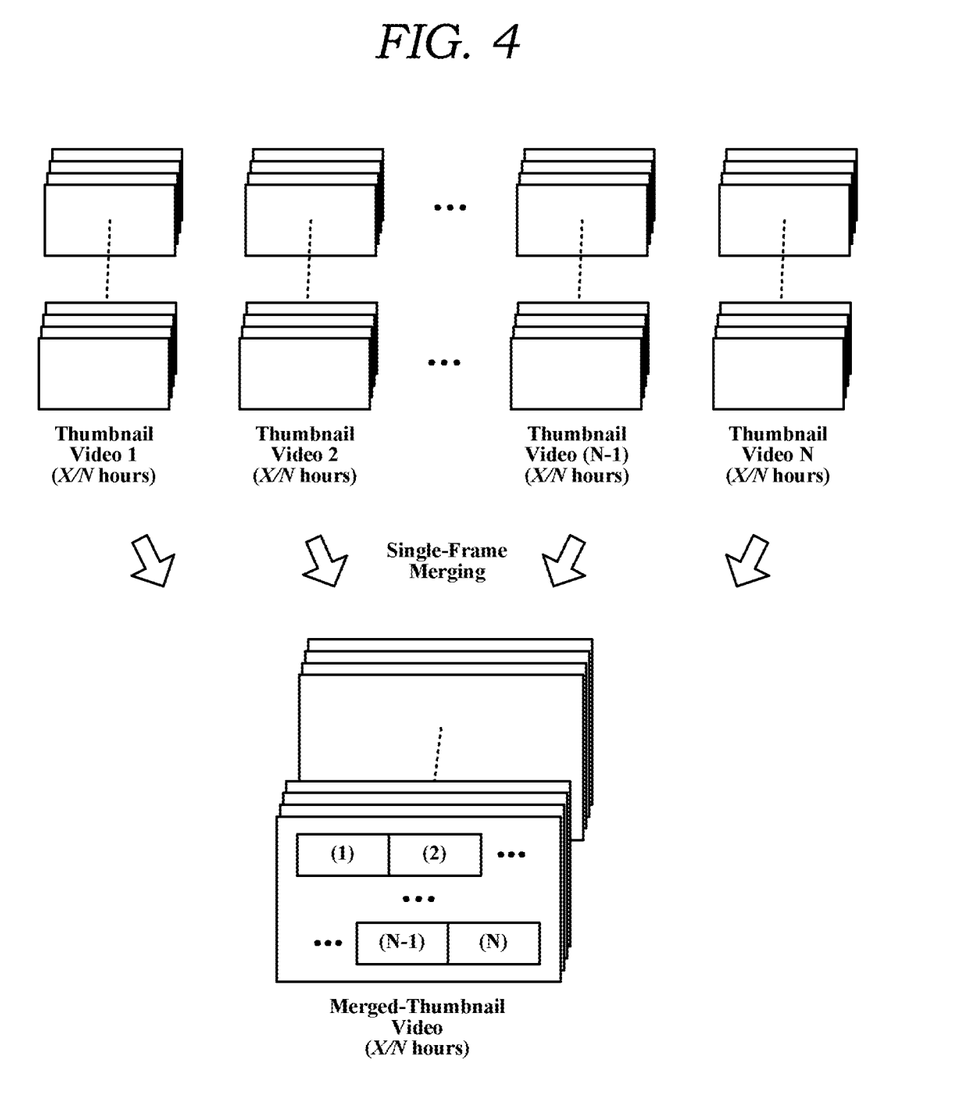
FIG. 4 is a view illustrating an example of generating merged-thumbnail video in the present invention.

FIG. 4 is a view illustrating an example of generating merged-thumbnail video in the present invention. Referring to FIG. 4, it is illustrated to merge the N thumbnail videos in a single frame into one merged-thumbnail video, in which all of the thumbnail videos and the merged-thumbnail video correspond to (X/N) hours. Each of thumbnail videos includes a series of frame images corresponding to time flow. The image preprocessor 300 merges N images of the same order from the N thumbnail videos in a single frame as shown in FIG. 3. By applying this procedure for a series of images of the N thumbnail videos, the merged-thumbnail video including a series of merged images is created.

Then, the image analysis engine 400 performs image analysis on the merged-thumbnail video so as to identify at least one moving object therefrom. By the way, because the technology of identifying a blob-type moving object by image analysis has already been generally proposed in the prior art and further the present invention does not claim the moving object detection algorithm itself, the detailed description thereof shall be omitted.

Comparing with the original video of X hours, the merged-thumbnail video of (X/N) hours contains (1/N) frames with each frame image of smaller size. That is, the size of frame images of the original video is 1920*1088, whereas that of the merged-thumbnail video is 480*272. Therefore, the image analysis for detecting moving objects may be efficiently performed according to the present invention.

Then, the image analysis engine 400 extracts metadata for each of the identified moving objects which corresponds to its exposure attribute. These metadata of the moving object may include at least one of size, location, appearance location, disappearance location, moving speed, moving distance, moving track, and dwell time of the moving object.

Because the metadata contains information on exposure attribute, it is preferably utilized in filtering the identified moving objects. In the above procedure, the image analysis engine 400 identifies any moving-like blobs as moving objects, by which nonsignificant or meaningless information may be included therein, e.g., leaves being shaken in the wind.

In order to efficiently obtain the critical objects, it is necessary to appropriately reduce the number of the identified moving objects which are candidates of the critical objects. For this purpose, the image analysis engine 400 filters out nonsignificant information out of the above-identified moving objects. The metadata may be preferably utilized in the filtering process, because the metadata corresponds to exposure attribute of the moving objects.

Then, the image analysis engine 400 obtains a snapshot of the moving object (hereinafter, it is referred as 'an object-snapshot'). The object-snapshot may be preferably utilized when staff members of the integrated control system effectively determine whether a moving object is entitled as a critical object or not. For this purpose, it is preferable that the object-snapshot is obtained from an image of the high-resolution original video.

Considering that the moving object is identified in the merged-thumbnail video, coordinate conversion is needed in order to obtain object-snapshot out of the original video.

The above-extracted metadata contains exposure attribute of the moving object in the merged-thumbnail video. By utilizing the exposure attribute, the image analysis engine 400 may identify a frame of the original video in which the moving object is detected (hereinafter, it is referred as 'a moving-detected original frame').

Then, the image analysis engine 400 may perform reverse-mapping on the moving-object location in the merged-thumbnail video by the downscaling ratio so as to identify the exposure area of the moving object in the moving-detected original frame (hereinafter, it is referred as 'a moving-object area').

By selecting the moving-object area from the original video, a high-resolution object-snapshot is obtained. Then, based on the high-resolution object-snapshot, staff members of the integrated control system may effectively determine whether the moving object is entitled as a critical object or not.

In the present specification, the storage video may be video data which has been collected for 24 hours in hard-disk drive, or may be video data which has been temporarily stored for a few seconds in a volatile local memory of video analysis apparatus. The moving-object detection technology of the present invention may be preferably utilized in post-processing field of video data which are collected for a long period. However, the present invention may also be utilized in real-time detection field.

Figure 5:
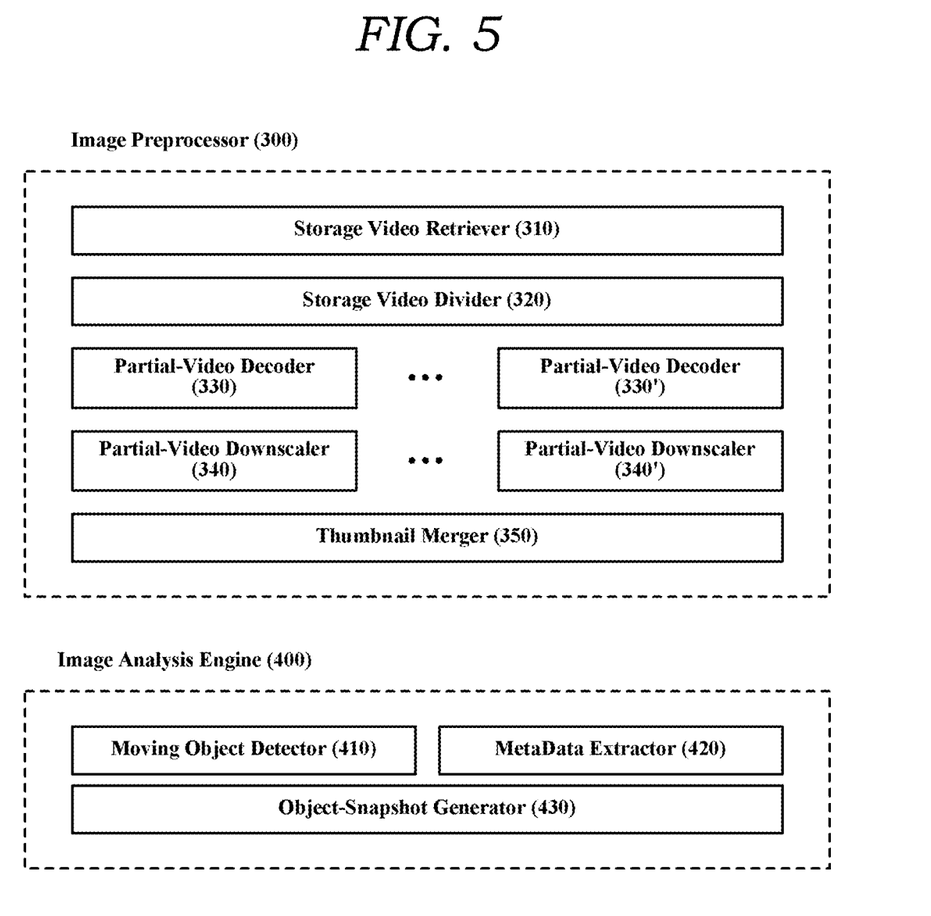
FIG. 5 is a block diagram illustrating an embodiment of the analytical processing system of CCTV storage video of the present invention.

FIG. 5 is a block diagram illustrating an embodiment of the analytical processing system of CCTV storage video of the present invention. Referring to FIG. 5, the analytical processing system comprises image preprocessor 300 and image analysis engine 400.

The image preprocessor 300 applies the video reconstruction to the CCTV storage video in order to significantly reduce the amount of video data. The video reconstruction includes video division and video merging. The image analysis engine 400 detects a moving object from the reconstructed video by performing image processing. Further, the image analysis engine 400 extracts metadata of the moving object which indicates exposure attribute thereof, and obtains snapshot of the moving object.

The image preprocessor 300 according to the present invention may include a storage video retriever 310, a storage video divider 320, a partial-video decoder 330, a partial-video downscaler 340, and a thumbnail merger 350.

The storage video retriever 310 obtains the CCTV storage video of X hours on which the image processing is performed in order to detect a moving object.

The storage video divider 320 divides the CCTV storage video of X hours by N so as to generate N partial videos each of which corresponds to about (X/N) hours.

The partial-video decoder 330 generates frame images out of the N partial videos. The partial videos are generally in compressed form, and correspondingly rather inadequate for image processing. Therefore, the video decoding is performed on the partial videos in order to facilitate the following procedures of downscaling and moving object identifying.

The partial-video downscaler 340 downscales the N partial videos into N thumbnail videos of small-size and low-resolution.

The thumbnail merger 350 merges the N thumbnail videos in a single frame so as to form a merged-thumbnail video. The merged-thumbnail video is of low-resolution and corresponds to about (X/N) hours.

In an embodiment, the image preprocessor 300 may be provided with N different CCTV storage videos, in which the storage video divider 320 may be unnecessary.

Further, the image analysis engine 400 according to the present invention may include a moving object detector 410, a metadata extractor 420, and an object-snapshot generator 430.

Then, the moving object detector 410 performs image analysis on the merged-thumbnail video which is low-resolution and corresponds to about (X/N) hours, so as to identify at least one blob-type moving object therefrom.

The metadata extractor 420 extracts metadata for each of the identified moving objects. The metadata corresponds to exposure attribute of the moving object in the merged-thumbnail video or each thumbnail video, which includes at least one of size, location, appearance location, disappearance location, moving speed, moving distance, moving track, and dwell time of the moving object.

The object-snapshot generator 430 performs reverse-mapping on the moving-object location in the merged-thumbnail video into the original video by the downscaling ratio so as to obtain snapshot image of the moving object from the high-resolution original video.

Figure 6:
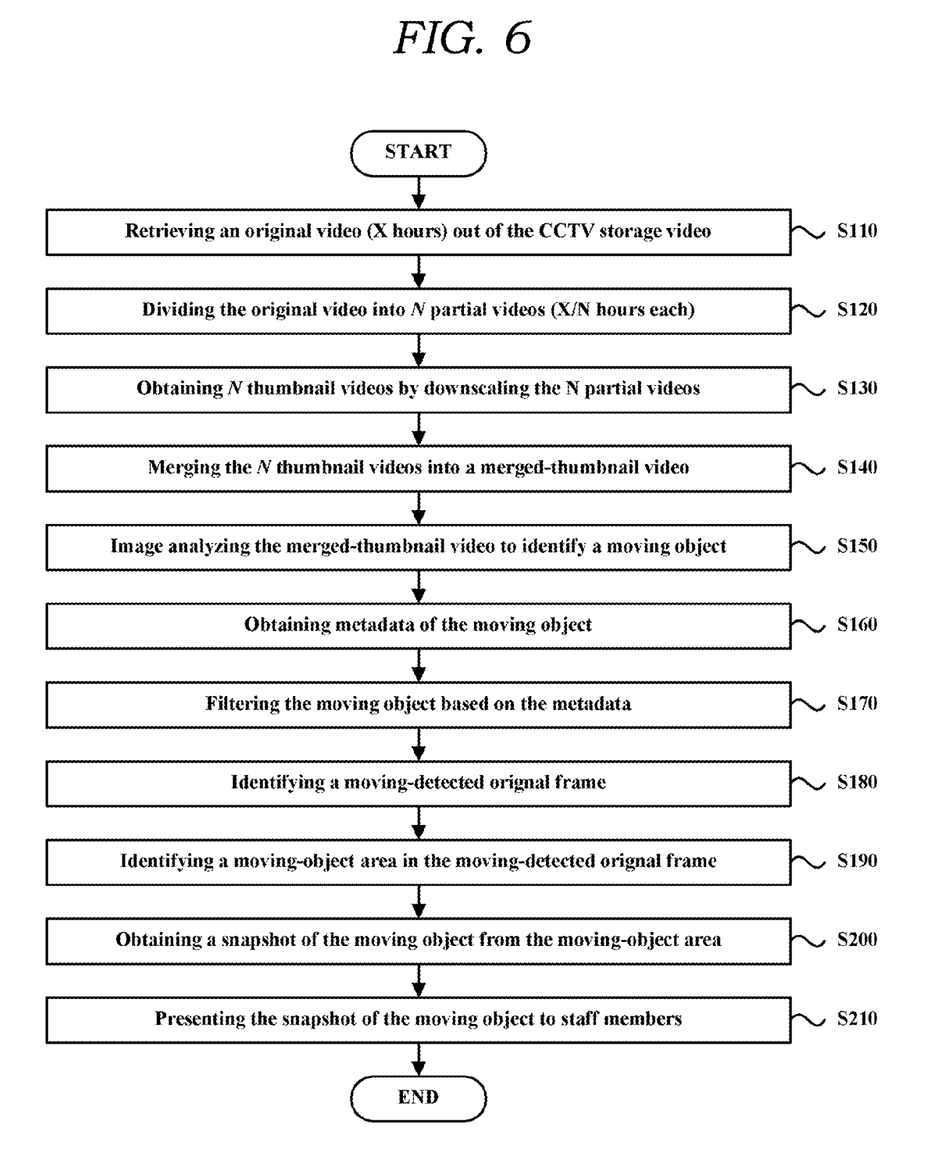
FIG. 6 is a flowchart illustrating the overall procedure of detecting moving objects out of CCTV storage video according to the present invention.

FIG. 6 is a flowchart illustrating the overall procedure of detecting moving objects out of CCTV storage video according to the present invention.

The storage video retriever 310 of the image preprocessor 300 retrieves an original video of a time period of X hours out of the CCTV storage video (S110). The original video of X hours may be either selected by operation of staff members or automatically selected by a configuration of image analysis software without intervention of staff members.

The storage video divider 320 divides the original video of X hours into N partial videos (S120). Each of the N partial videos corresponds to about (X/N) hours, respectively. Preferably, the storage video divider 320 equally divides the original video. However, this invention is not limited thereto.

However, in other embodiment, the image preprocessor 300 may be provided with N different CCTV storage videos as the N partial videos from N CCTV cameras, without necessity of dividing the original video into the N partial videos. However, FIG. 6 is prepared with assuming that the original video is divided by N so as to obtain the partial videos.

The partial-video decoder 330 and the partial-video downscaler 340 may cooperate together so as to downscale each of the N partial videos so as to collectivley obtain N thumbnail videos (S130). Each of the thumbnail video is low-resolution video which is created by downscaling each of the partial video.

The thumbnail merger 350 merges the N thumbnail videos in a single frame so as to form a merged-thumbnail video (S140). The merged-thumbnail video is a single frame collection of the N thumbnail videos, and is still lower-resolution video than the original video. This merging procedure has been described above with referring to FIG. 4.

Then, the moving object detector 410 of the image analysis engine 400 performing image analysis on the merged-thumbnail video so as to identify at least one blob-type moving object out of the merged-thumbnail video (S150).

For each of the moving object which is identified above by the image analysis engine 400, the metadata extractor 420 extracts and collects metadata corresponding to exposure attribute in the merged-thumbnail video (S160). These metadata of the moving object may include at least one of size, location, appearance location, disappearance location, moving speed, moving distance, moving track, and dwell time of the moving object.

The metadata extractor 420 may perform filtering based on the metadata on the identified moving object (S170). The moving object detector 410 regards any moving-like blob in the low-resolution merged-thumbnail video as a moving object. Then, the output of the moving object detector 410 shall contain nonsignificant or meaningless information. Therefore, it is preferable that the metadata extractor 420 classifies the moving object into either significant object or nonsignificant object by comparing its metadata with predetermined threshold condition and then filters out the nonsignificant object.

In order to obtain a snapshot of the moving object from the high-resolution original video, the object-snapshot generator 430 identifies a frame of the original video in which the moving object has been identified (hereinafter, it is referred as 'a moving-detected original frame') (S180). Through the metadata extraction procedure, the exposure attribute of the moving object are obtained from the merged-thumbnail video. When a frame of the merged-thumbnail video exposing the moving object in sufficient size as well as its exposure location in the frame are identified, the corresponding frame in the original video may be identified.

The object-snapshot generator 430 performs reverse-mapping on the moving-object location in the merged-thumbnail video by the downscaling ratio so as to identify the exposure area of the moving object in the moving-detected original frame (hereinafter, it is referred as 'a moving-object area') (S190). Considering that the moving object has been identified out of the merged-thumbnail video, the coordinate conversion is needed in order to obtain high-resolution object-snapshot out of the original video. The reverse-mapping by the downscaling ratio is performed in order to achieve the coordinate conversion.

The object-snapshot generator 430 selects the moving-object area out of the moving-detected original frame so as to obtain a high-resolution object-snapshot (S200).

Then, object-snapshot generator 430 presents the object-snapshot to staff members in order to assist the search of critical objects. For example, the object-snapshot may be overlaid on the display of original video (S210). Preferably, the snapshot of the moving object is presented distinguishably from the original video. In an embodiment, the object-snapshot may be displayed on a separate window from the original video. In other embodiment, when a staff member selects a critical object by a mouse click in the original video, the corresponding object-snapshot is overlaid on the original video.

Figure 7:
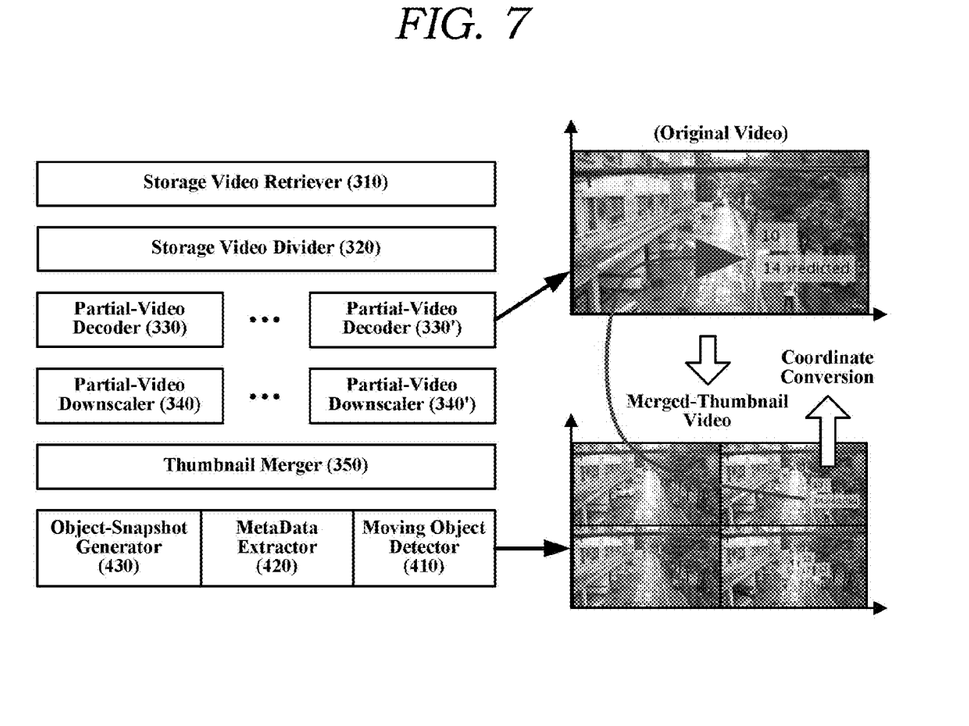
FIG. 7 illustrates an example of detecting moving objects out of CCTV storage video according to the present invention.

FIG. 7 illustrates an example of detecting moving objects out of CCTV storage video according to the present invention.

In the present invention, the partial-video decoders 330 decode the CCTV storage video so as to display the original video in high-resolution. In an embodiment, each of the N partial-video decoders 330 decodes the corresponding one of the the high-resolution N partial videos.

At the same time, the moving object detector 410 promptly identifies a moving object in the low-resolution merged-thumbnail video. Further, the metadata extractor 420 identifies exposure attribute of the moving object so as to generate metadata for the moving object.

The moving object and its metadata may be presented along with the CCTV video on the CCTV monitoring screen. The information may be displayed on high-resolution original video, or on low-resolution merged-thumnail video. In case of displaying the information on high-resolution original video, the reverse-mapping by downscaling ratio for coordinate conversion shall be needed as described above.

As described above, the method of detecting moving object according to the present invention provides one or more of the following effects.

The present invention makes it possible to fast detect the moving objects out of the CCTV storage video and further to extract the metadata thereof. Therefore, staff members of the integrated control center may efficiently search any possible critical objects out of massive CCTV videos gathered from pluralities of CCTV cameras.

The invention can also be embodied as computer readable codes on a non-transitory computer-readable medium. The non-transitory computer-readable medium is any data storage device that can store data which may be thereafter read by a computer system, which include read-only memory (ROM), random-access memory (RAM), CD-ROMs, magnetic tapes, floppy disks, and optical data storage devices. The non-transitory computer-readable medium can also be distributed over network coupled computer systems so that the computer readable code is stored and executed in a distributed fashion.

What is claimed is:

1. A method of detecting a moving object in CCTV storage video by reconstructive image processing, the method comprising:
  obtaining N partial videos of the CCTV storage video (where, N is an integer; N>2);
  obtaining N thumbnail videos by downscaling the N partial videos, respectively;
  merging the N thumbnail videos in a single frame so as to form a merged-thumbnail video;
  performing image analysis on the merged-thumbnail video so as to identify a moving object out of the merged-thumbnail video;
  obtaining metadata of the moving object corresponding to exposure attribute in the merged-thumbnail video;
  identifying a frame of the original video in which the moving object is identified based on the metadata (hereinafter, it is referred as 'a moving-detected original frame');
  reverse-mapping the moving-object location in the merged-thumbnail video by the downscaling ratio so as to identify the exposure area of the moving object in the moving-detected original frame (hereinafter, it is referred as 'a moving-object area'); and
  selecting the moving-object area out of the moving-detected original frame so as to obtain a snapshot of the moving object.

2. The method according to the claim 1, wherein the obtaining N partial videos comprises,
  obtaining an original video of a predetermined time period out of the CCTV storage video; and
  dividing the original video into the N partial videos.

3. The method according to the claim 1, wherein the metadata of the moving object includes at least one of size, location, appearance location, disappearance location, moving speed, moving distance, moving track, and dwell time of the moving object.

4. The method according to the claim 1, wherein the method further comprising:
  classifying the moving object into either significant object or nonsignificant object by comparing the metadata with predetermined threshold condition; and
  filtering out the nonsignificant object.

5. The method according to the claim 4, wherein the method further comprising:
  presenting the snapshot of the moving object to staff members distinguishably from the original video.

6. A non-transitory computer-readable medium containing program code which executes a method of detecting moving object in CCTV storage video by reconstructive image processing, the method comprising:
  obtaining N partial videos of the CCTV storage video (where, N is an integer; N>2);
  obtaining N thumbnail videos by downscaling the N partial videos, respectively;
  merging the N thumbnail videos in a single frame so as to form a merged-thumbnail video;
  performing image analysis on the merged-thumbnail video so as to identify a moving object out of the merged-thumbnail video;
  obtaining metadata of the moving object corresponding to exposure attribute in the merged-thumbnail video;
  identifying a frame of the original video in which the moving object is identified based on the metadata (hereinafter, it is referred as 'a moving-detected original frame');
  reverse-mapping the location in the merged-thumbnail video in which the moving object is identified by the downscaling ratio so as to identify the exposure area of the moving object in the moving-detected original frame (hereinafter, it is referred as 'a moving-object area'); and
  selecting the moving-object area out of the moving-detected original frame so as to obtain a snapshot of the moving object.

7. The non-transitory computer-readable medium according to claim 6, wherein the obtaining N partial videos comprises,
  obtaining an original video of a predetermined time period out of the CCTV storage video; and
  dividing the original video into the N partial videos.

8. The non-transitory computer-readable medium according to claim 6, wherein the metadata of the moving object includes at least one of size, location, appearance location, disappearance location, moving speed, moving distance, moving track, and dwell time of the moving object.

9. The non-transitory computer-readable medium according to claim 6, wherein the method further comprising:

classifying the moving object into either significant object or nonsignificant object by comparing the metadata with predetermined threshold condition; and filtering out the nonsignificant object.

10. The non-transitory computer-readable medium according to claim 9, wherein the method further comprising:

presenting the snapshot of the moving object to staff members distinguishably from the original video.

* * * * *